US012599120B2

(12) United States Patent
Chang et al.

(10) Patent No.: US 12,599,120 B2
(45) Date of Patent: Apr. 14, 2026

(54) WATERPROOF SPINNING FISHING REEL

(71) Applicant: OKUMA FISHING TACKLE CO., LTD., Taichung City (TW)

(72) Inventors: Liang-Jen Chang, Taichung City (TW); Tsung-Jen Tu, Taichung City (TW)

(73) Assignee: OKUMA FISHING TACKLE CO., LTD., Taichung City (TW)

( * ) Notice: Subject to any disclaimer, the term of this patent is extended or adjusted under 35 U.S.C. 154(b) by 182 days.

(21) Appl. No.: 18/740,328

(22) Filed: Jun. 11, 2024

(65) Prior Publication Data

US 2025/0374904 A1 Dec. 11, 2025

(51) Int. Cl.
*A01K 89/01* (2006.01)

(52) U.S. Cl.
CPC ............................ *A01K 89/011223* (2015.05)

(58) Field of Classification Search
None
See application file for complete search history.

(56) References Cited

U.S. PATENT DOCUMENTS 5,503,343 A * 4/1996 Hirano ............... A01K 89/0117
242/247
5,927,630 A * 7/1999 Katayama .......... A01K 89/0117
242/247

6,802,468 B2 * 10/2004 Takikura ................ A01K 89/00
277/653
2017/0030469 A1 * 2/2017 Hirayama ................ F16J 15/43
2019/0101159 A1 * 4/2019 Ohara .................... F16C 33/765
2022/0174925 A1 * 6/2022 Talwin ............... A01K 89/0117
2023/0101950 A1 * 3/2023 Ochiai ............. A01K 89/01928
242/319

* cited by examiner

*Primary Examiner* — William A. Rivera
(74) *Attorney, Agent, or Firm* — Birch, Stewart, Kolasch & Birch, LLP

(57) ABSTRACT

A waterproof spinning fishing reel includes a housing having an accommodation, an opening and an opening edge, a worm located in the accommodation and extending out of the opening, a bushing sleeved onto the worm, a waterproof bearing having a first outer race abutting against the housing, and a first inner race sleeved onto the bushing, a cover having a plate portion mounted to the housing and abutted against the first outer race, a rotor assembly mounted to the worm and provided with an abutment portion abutting against the bushing, an outer seal ring sleeved onto the first outer race and sandwiched between the plate portion and the opening edge, and an inner seal ring sleeved onto the bushing and sandwiched between the abutment portion and the first inner race. This arrangement reduces friction between the rotor assembly and the housing, enhancing smoothness of usage.

11 Claims, 6 Drawing Sheets

WATERPROOF SPINNING FISHING REEL

BACKGROUND OF THE INVENTION

1. Field of the Invention

The present invention relates generally to a fishing tackle and more particularly, to a waterproof spinning fishing reel.

2. Description of the Related Art

A conventional spinning fishing reel is composed of a housing, a handle installed at a side of the housing, a line spool disposed at a front of the housing, and a rotor assembly positioned between the housing and the line spool. When the user rotates the handle, the rotor assembly is driven to rotate, thereby winding the fishing line onto the line spool. To protect the internal components installed inside the housing from moisture or salt corrosion, a waterproof seal ring is usually installed between the housing and the rotor assembly. However, since the waterproof seal ring is located between the stationary housing and the rotating rotor assembly, unavoidable friction occurs, affecting the usage smoothness of the spinning fishing reel. Therefore, there is a need for improvement.

SUMMARY OF THE INVENTION

The present invention has been accomplished in view of the above-noted circumstances. It is an objective of the present invention to provide a waterproof spinning fishing reel, which can reduce the friction between the rotor assembly and the housing, thereby enhancing the usage smoothness thereof.

To attain the above-mentioned and other objectives, the present invention provides a waterproof spinning fishing reel comprising a housing, a worm, a bushing, a waterproof bearing, a cover, a rotor assembly, an outer seal ring, and an inner seal ring. The housing has an accommodation, an opening at a front end of the accommodation, and an opening edge surrounding the opening. The worm is located in the accommodation and extends forward out of the opening. The bushing is sleeved onto the worm. The waterproof bearing has a first outer race abutting against the housing, and a first inner race sleeved onto the bushing. The cover has a plate portion mounted to the housing and abutted against the first outer race of the waterproof bearing, and a through hole communicating the accommodation to an outside of the cover. The rotor assembly is disposed at an outer end of the worm and driven by the worm to rotate. The rotor assembly has an abutment portion abutting against the bushing. The outer seal ring is sleeved onto the first outer race of the waterproof bearing and sandwiched between the plate portion of the cover and the opening edge of the housing. The inner seal ring is sleeved onto the bushing and sandwiched between the abutment portion of the rotor assembly and the first inner race of the waterproof bearing. With the aforesaid technical features, the friction between the rotor assembly and the housing can be reduced, thereby enhancing the usage smoothness of the spinning fishing reel.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
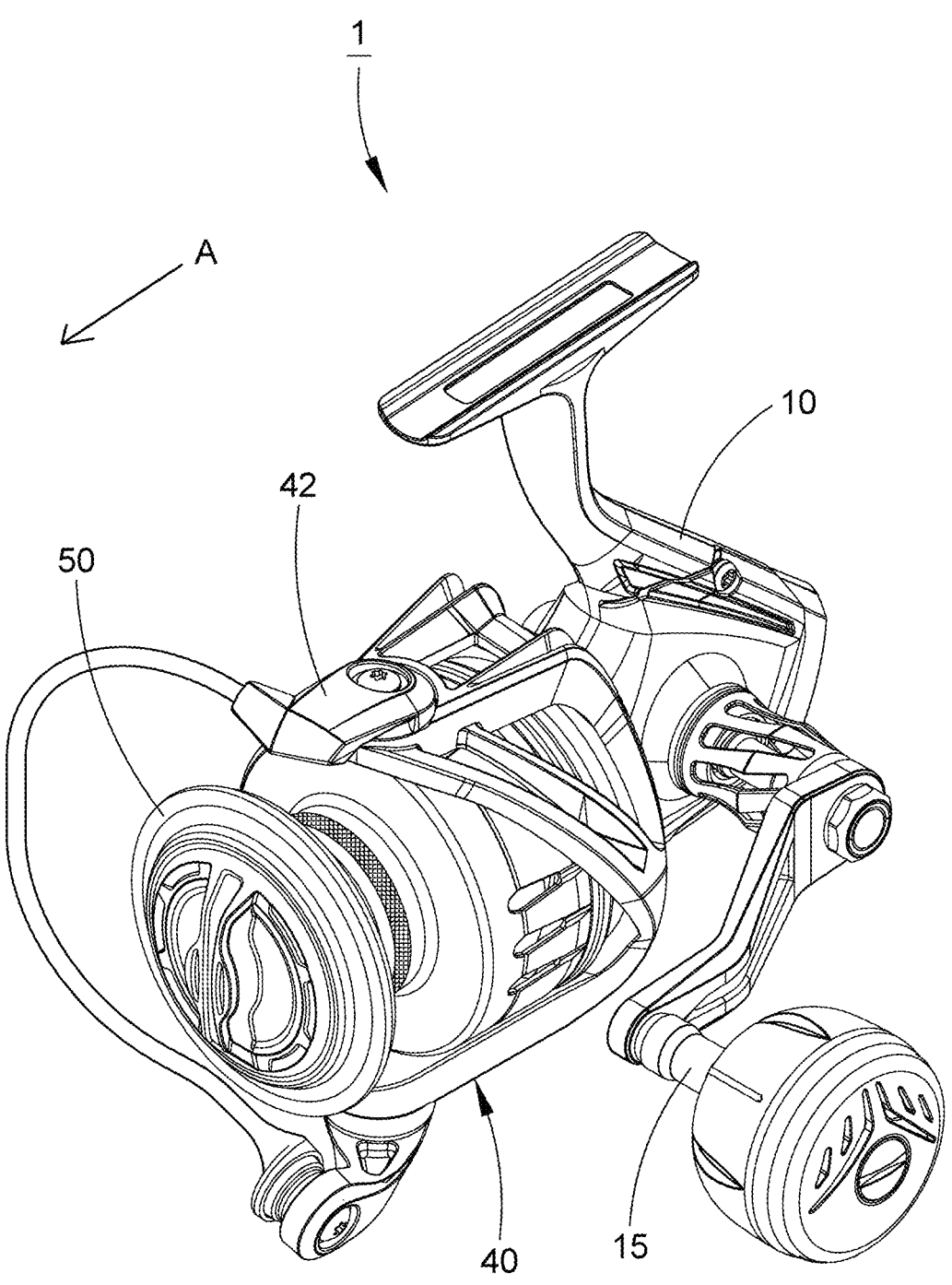
FIG. 1 is a perspective view of a waterproof spinning fishing reel according to a first preferred embodiment of the present invention.
Figure 2:
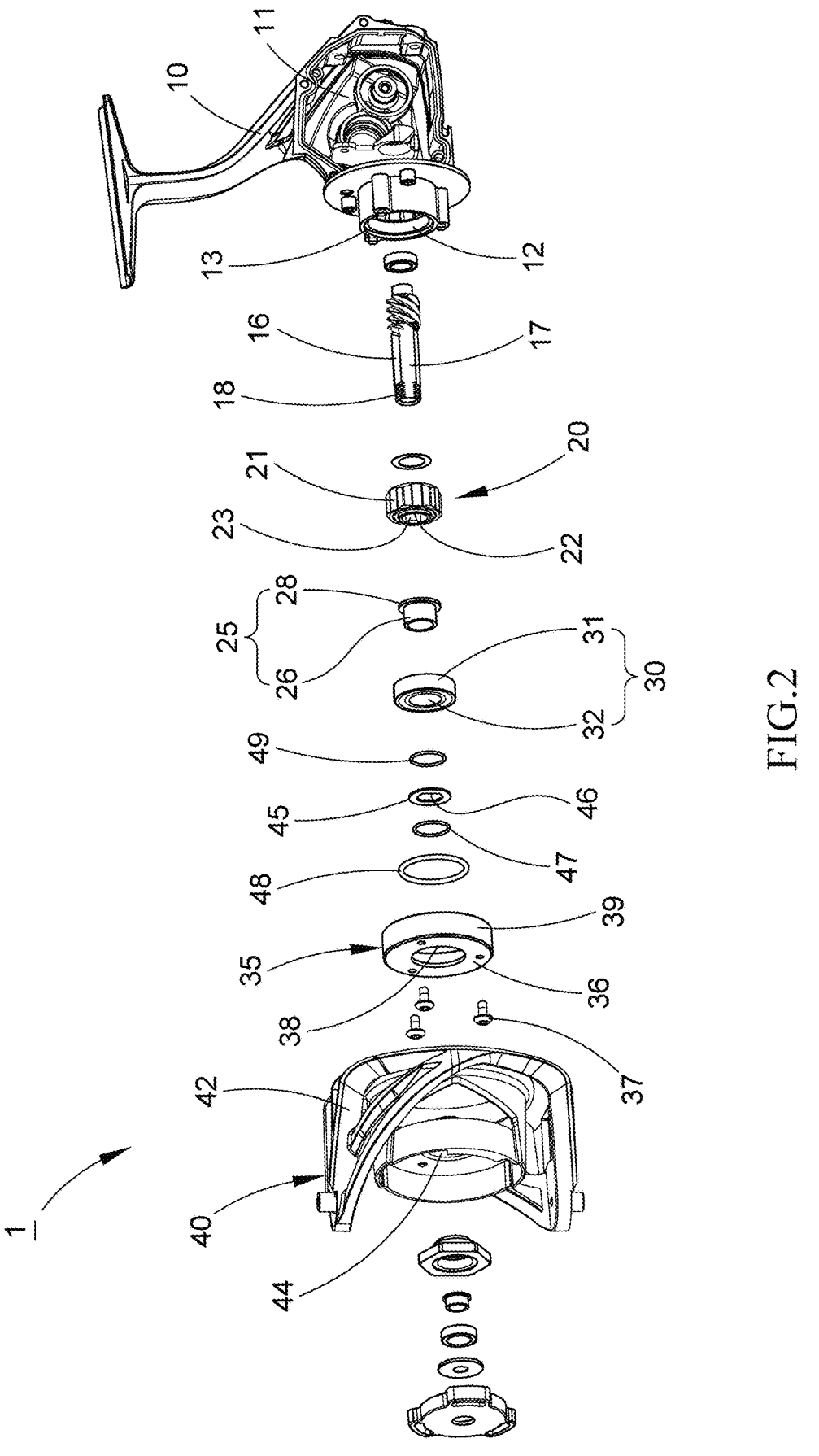
FIG. 2 is a partially exploded view of the waterproof spinning fishing reel of the first preferred embodiment of the present invention.
Figure 3:
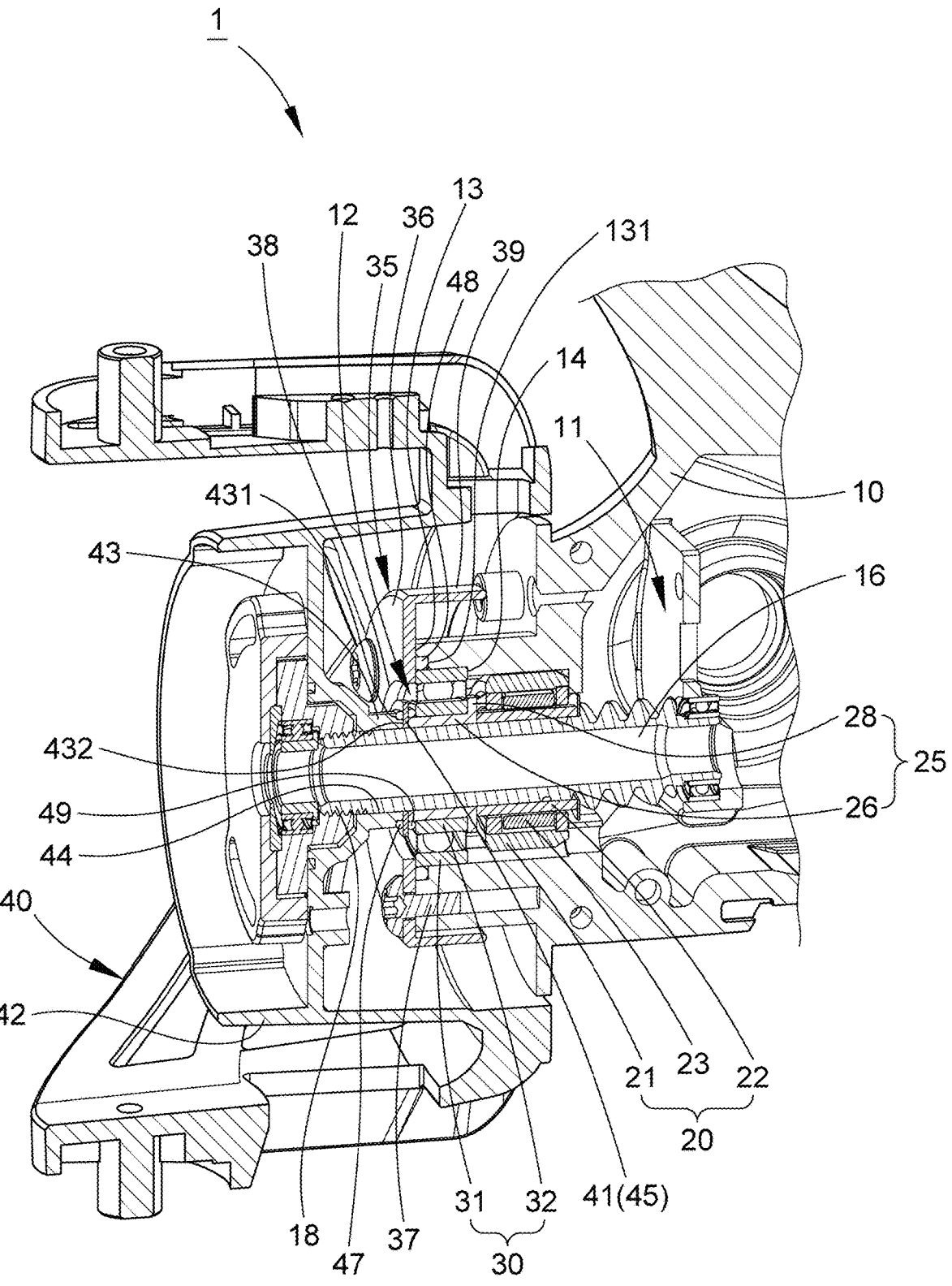
FIG. 3 is a partially sectional view of the waterproof spinning fishing reel of the first preferred embodiment of the present invention.

Hereunder four preferred embodiments will be detailedly described with accompanying drawings for illustrating technical features and structure of the present invention. As shown in FIGS. 1-3, a waterproof spinning fishing reel 1 provided by a first preferred embodiment of the present invention is mainly composed of a housing 10, a handle 15, a worm 16, a one-way bearing 20, a bushing 25, a waterproof bearing 30, a cover 35, a rotor assembly 40, an outer seal ring 48, an inner seal ring 49, and a line spool 50. For convenience of illustration, the direction indicated by arrow A in FIG. 1 is considered as the front direction, while the opposite direction is the rear direction. However, these directions should not be construed as limiting the scope of the claims of the present invention.

The housing 10 has an accommodation 11 for accommodating components such as a transmission mechanism (not shown), a circular opening 12 located at a front end of the accommodation 11, an annular opening edge 13 surrounding the opening 12, and a stepped annular stop portion 14 inside the accommodation 11.

The handle 15 is provided at one side of the housing 10 and connected with the transmission mechanism.

The worm 16 is located inside the accommodation 11 and extends forward out of the opening 12. The worm 16 is connected with the transmission mechanism at its rear section, such that the worm 16 can be rotated by the transmission mechanism when the handle 15 is rotated. The outer periphery of the middle section of the worm 16 has two parallel flattened surfaces 17, allowing the rotational power of the worm 16 to be transmitted to the rotor assembly 40 (as described below). However, in other embodiments, the worm 16 may provide only one flattened surface 17, or the cross-section of the middle section of the worm 16 may be non-circular.

The one-way bearing 20 includes an outer race, namely a second outer race 21, abutting against the housing 10, an inner race, namely a second inner race 22, sleeved onto the worm 16 and abutted against the bushing 25, and a plurality of rolling elements 23 disposed between the second outer race 21 and the second inner race 22. The inner periphery of the second inner race 22 has two flat portions 23 abutting against the two flattened surfaces 17 of the worm 16, thereby allowing the second inner race 22 to rotate together with the worm 16. Thus, the one-way bearing 20 can restrict the worm 16 to rotate only in one direction.

The bushing 25 has a circular tube portion 26 sleeved onto the worm 16, and a stop edge 28 extending outwardly and radially from an inner end of the tube portion 26.

The waterproof bearing 30 has an outer race, namely a first outer race 31, abutting against the housing 10 and the stop portion 14, an inner race, namely a first inner race 32, sleeved onto the tube portion 26 of the bushing 25 and abutted against the stop edge 28, and a plurality of balls (not shown) provided between the first outer race 31 and the first inner race 32. The first inner race 32 is restricted between the stop edge 28 and the inner seal ring 49. The waterproof bearing 30 can prevent liquid water from passing through between the first outer race 31 and the first inner race 32.

The cover 35 has a plate portion 36 secured to the housing 10 by three bolts 37, a through hole 38 communicating the accommodation 11 with an outside of the cover 35, and a cover tube 39 extending inwardly from the plate portion 36. The plate portion 36 abuts against the opening edge 13 and the first outer race 31 of the waterproof bearing 30, allowing the first outer race 31 to be restricted between the plate portion 36 and the stop portion 14.

The rotor assembly 40 is mounted at an outer end 18 of the worm 16, such that the rotor assembly 40 can be driven by the worm 16 to rotate. The rotor assembly 40 has an abutment portion 41 abutting against the bushing 25. Specifically, the rotor assembly 40 includes a rotor 42, a washer 45, and a front seal ring 47. The rotor 42 has an inner tube 43, and the washer 45 is sandwiched between the inner tube 43 and the tube portion 26 of the bushing 25. The inner tube 43 has a shaft hole 44 corresponding in shape to the outer periphery of the worm 16 in the middle section. The washer 45 also has a shaft hole 46 corresponding in shape to the outer periphery of the middle section of the worm 16. This arrangement allows both the rotor 42 and the washer 45 to be rotated together with the worm 16. Consequently, the rotor 42 can be rotated by the handle 15 to wind the fishing line (not shown) onto the line spool 50. In this embodiment, the washer 45 forms the abutment portion 41, and the front seal ring 47 is sleeved onto the inner tube 43 and abutted against the washer 45, preventing water or moisture from entering the gap between the inner tube 43 and the washer 45, achieving the waterproof effect. To securely position the front seal ring 47, the outer periphery of the inner tube 43 may be provided with an outer ring recess 431 to accommodate the front seal ring 47.

The outer seal ring 48 is sleeved onto the first outer race 31 of the waterproof bearing 30 and sandwiched between the plate portion 36 of the cover 35 and the opening edge 13 of the housing 10, preventing water or moisture from entering the gap between the housing 10 and the first outer race 31, achieving the waterproof effect. To securely position the outer seal ring 48, a recess 131 may be provided on the opening edge 13 of the housing 10 to accommodate the outer seal ring 48.

The inner seal ring 49 is sleeved onto the bushing 25 and sandwiched between the abutment portion 41 of the rotor assembly 40 and the first inner race 32 of the waterproof bearing 30, preventing water or moisture from entering the gap between the bushing 25 and the washer 45, while also preventing water or moisture from entering the gap between the bushing 25 and the first inner race 32, achieving the waterproof effect.

When the handle 15 is rotated, the worm 16 will be rotated through the transmission mechanism. At this time, components rotating along with the worm 16 include the bushing 25, the first inner race 32 of the waterproof bearing 30, the inner seal ring 49, the washer 45, the front seal ring 47, and the rotor 42. In contrast, the outer seal ring 48, the housing 10, the cover 35, and the first outer race 31 of the waterproof bearing 30 remain stationary in place. In other words, the front seal ring 47, the outer seal ring 48, and the inner seal ring 49 do not have relative motion with adjacent components, thereby avoiding friction. The friction between the rotor assembly 40 and the housing 10 only comes from the waterproof bearing 30 and the one-way bearing 20, effectively reducing the friction between the rotor assembly 40 and the housing 10, enhancing the usage smoothness of the waterproof spinning fishing reel, and providing the effect of preventing water from entering the interior of the housing 10, thus achieving the objective of the present invention.

Figure 4:
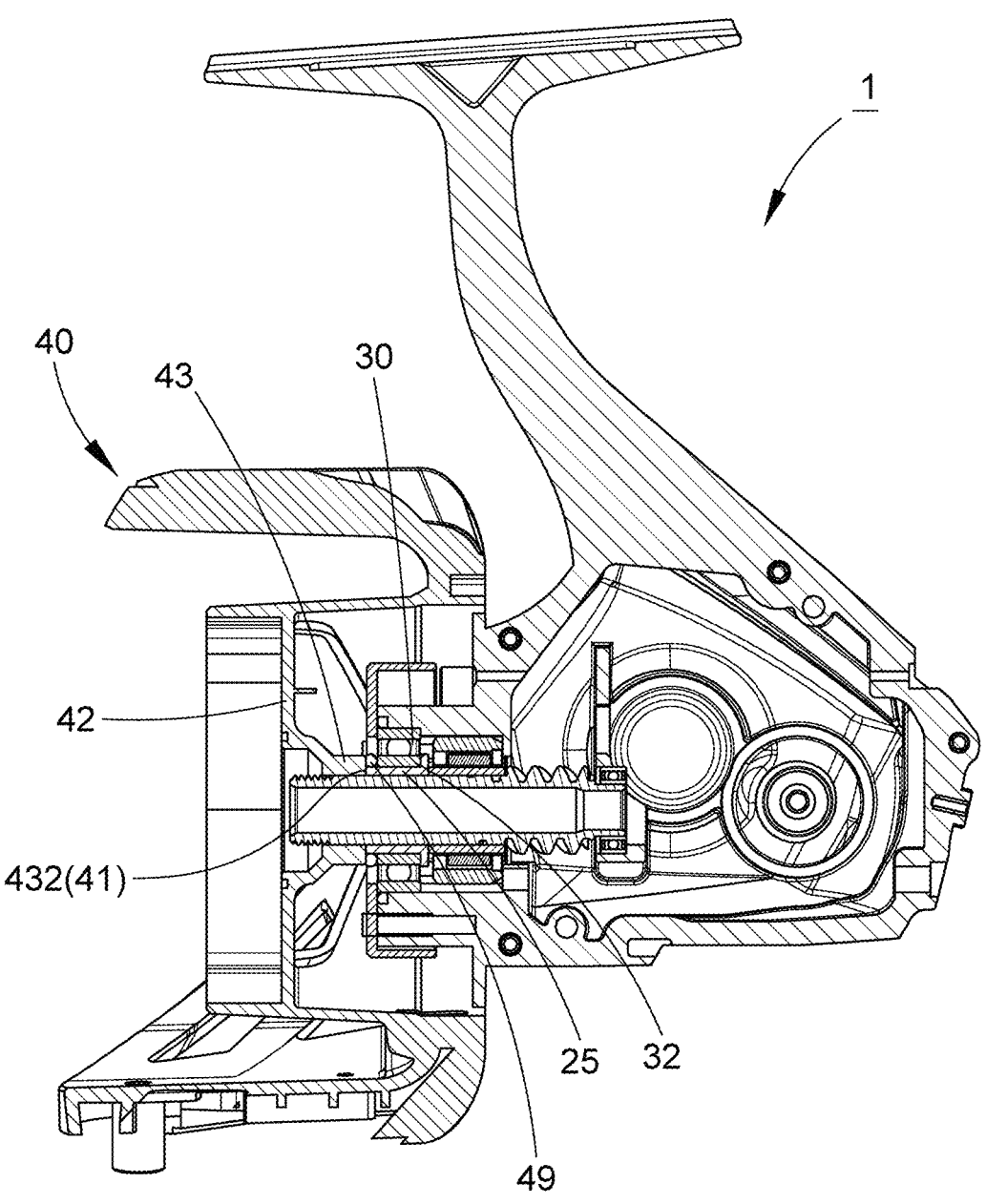
FIG. 4 is a partially sectional view of a waterproof spinning fishing reel according to a second preferred embodiment of the present invention.

Based on the above-mentioned structural features, various modifications to the waterproof spinning fishing reel 1 may be made. For example, FIG. 4 shows a waterproof spinning fishing reel provided in accordance with a second preferred embodiment of the present invention, which has a structure basically similar to that of the first embodiment, with the difference that the rotor assembly 40 omits the washer 45 and front seal ring 47. The inner end 432 of the inner tube 43 of the rotor 42 forms the abutment portion 41 and abuts against the bushing 25. The inner seal ring 49 is then sleeved onto the bushing 25 and sandwiched between the abutment portion 41 and the first inner race 32 of the waterproof bearing 30, thereby preventing water or moisture from entering the gap between the bushing 25 and the inner tube 43 and avoiding water or moisture from entering the gap between the bushing 25 and the first inner race 32, achieving the waterproof effect in that area.

Figure 5:
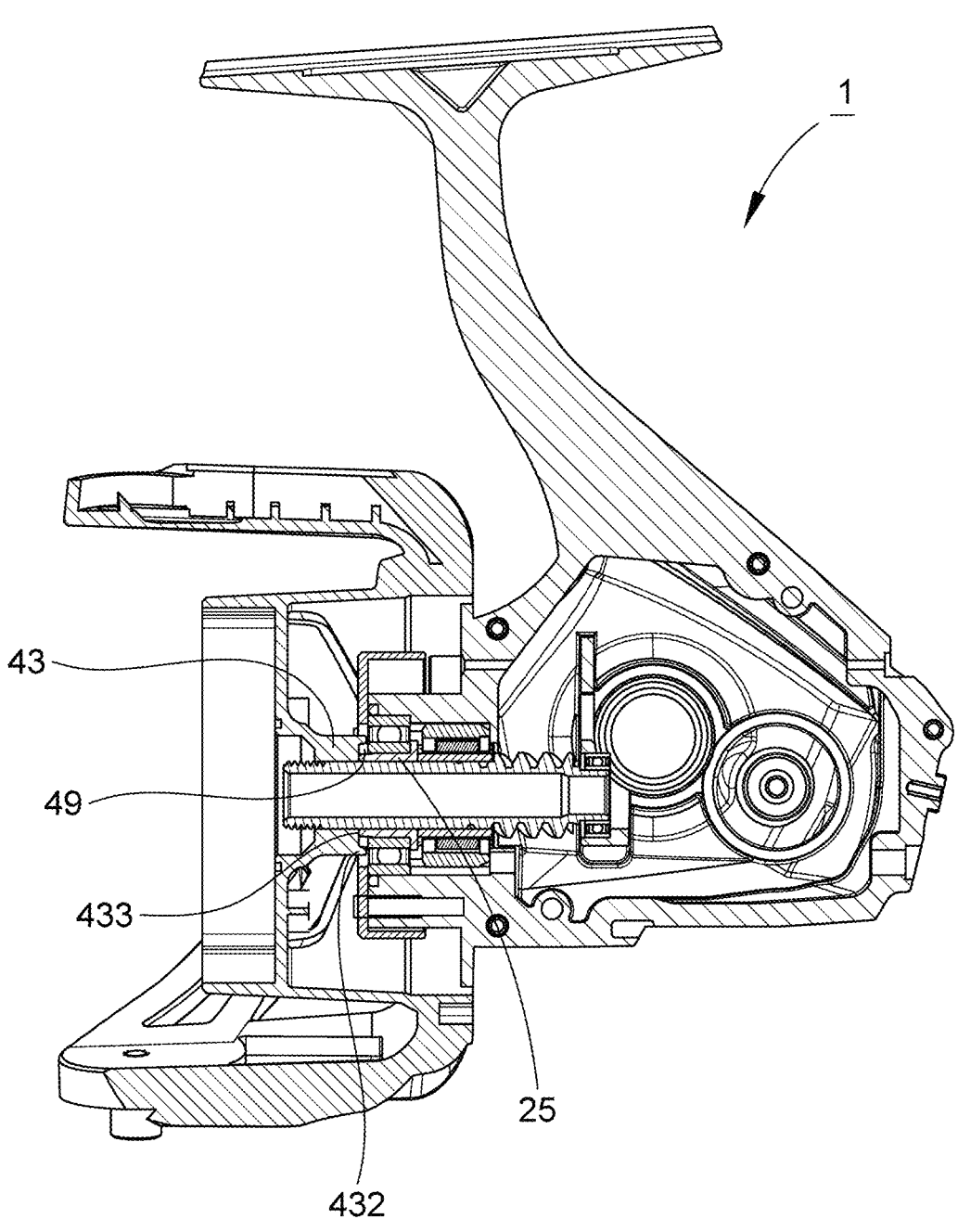
FIG. 5 is a partially sectional view of a waterproof spinning fishing reel according to a third preferred embodiment of the present invention.
Figure 6:
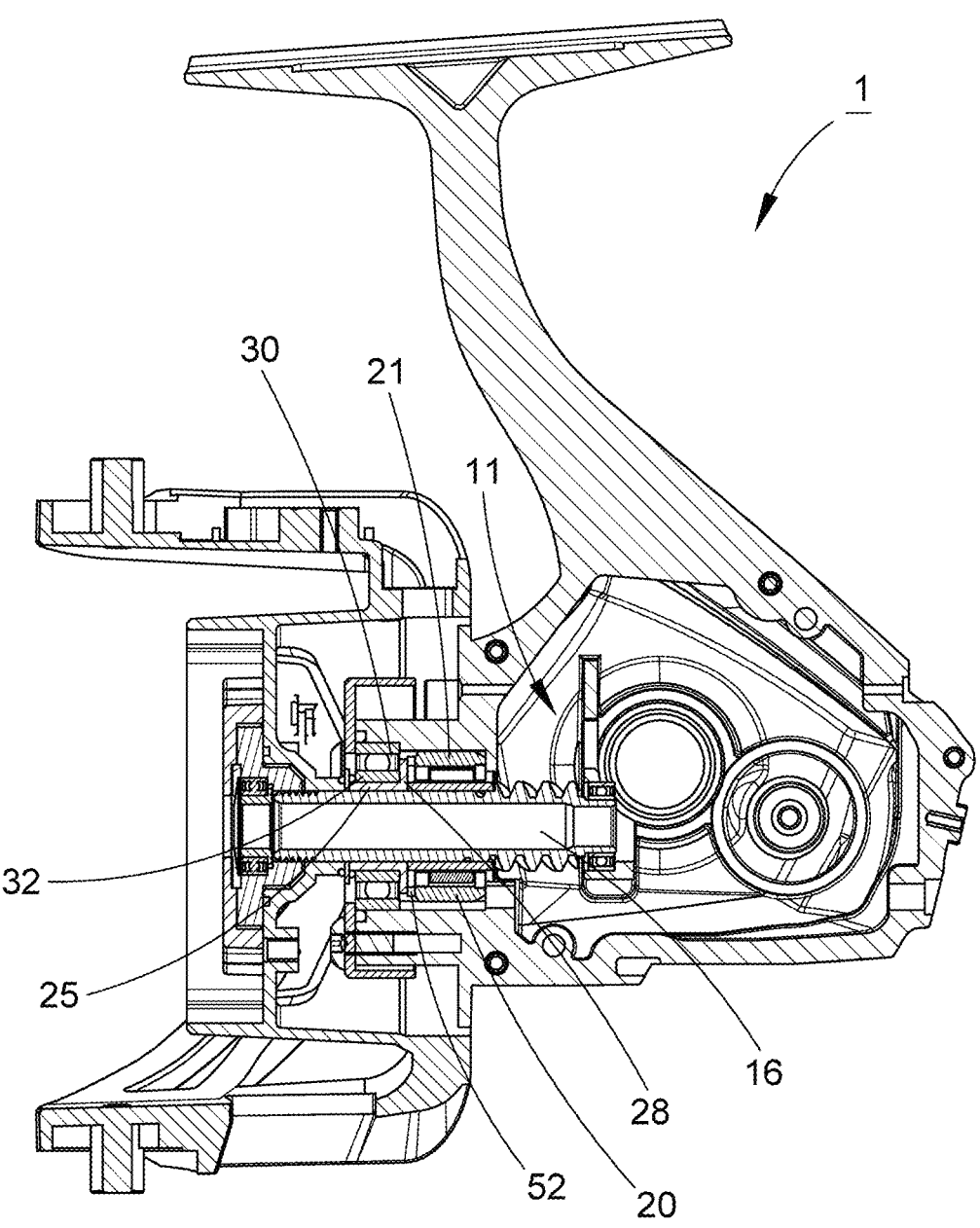
FIG. 6 is a partially sectional view of a waterproof spinning fishing reel according to a fourth preferred embodiment of the present invention.

Furthermore, FIG. 5 shows a waterproof spinning fishing reel provided in accordance with a third preferred embodiment of the present invention, which has a structure basically similar to that of the second embodiment, with the difference that the inner end 432 of the inner tube 43 has an inner ring recess 433, which accommodates a portion of the bushing 25 and the inner seal ring 49, so that the inner seal ring 49 is more securely positioned in place. Moreover, FIG. 6 shows a waterproof spinning fishing reel provided in accordance with a fourth preferred embodiment of the present invention, which has a structure basically similar to that of the first embodiment, with the difference that it further includes a support ring piece 52, which is sleeved onto the worm 16 and sandwiched between the stop edge 28 of the bushing 25 and the second outer race 21 of the one-way bearing 20. Thus, the support ring piece 52 can assist the first inner race 32 and the bushing 25 in withstanding the force acting toward interior of the accommodation 11, i.e., acting backward thereon, thereby reducing the deformation of the waterproof bearing 30 and the inner seal ring 49, and prolonging the service life of the waterproof bearing 30 and the inner seal ring 49.

In addition, the stop portion 14 of the housing 10 may be omitted. Any such easily conceivable structural changes should be within the scope of the claims of the present invention.

What is claimed is:

1. A waterproof spinning fishing reel, comprising:
a housing having an accommodation, an opening at a front end of the accommodation, and an opening edge surrounding the opening;
a worm located in the accommodation and extending forward out of the opening;
a bushing sleeved onto the worm;

a waterproof bearing having a first outer race abutting against the housing, and a first inner race sleeved onto the bushing;

a cover having a plate portion mounted to the housing and abutted against the first outer race of the waterproof bearing, and a through hole communicating the accommodation to an outside of the cover;

a rotor assembly disposed at an outer end of the worm and driven by the worm to rotate, the rotor assembly having an abutment portion abutting against the bushing;

an outer seal ring sleeved onto the first outer race of the waterproof bearing and sandwiched between the plate portion of the cover and the opening edge of the housing; and an inner seal ring sleeved onto the bushing and sandwiched between the abutment portion of the rotor assembly and the first inner race of the waterproof bearing.

2. The waterproof spinning fishing reel as claimed in claim 1, wherein the housing has a stop portion abutted by the first outer race of the waterproof bearing in a way that the first outer race is restricted between the plate portion and the stop portion.

3. The waterproof spinning fishing reel as claimed in claim 1, wherein an outer periphery of the worm has at least one flattened surface.

4. The waterproof spinning fishing reel as claimed in claim 3, wherein the rotor assembly comprises a rotor, a washer, and a front seal ring; the rotor comprises an inner tube; the washer is sandwiched between the inner tube and the bushing; the washer has a shaft hole corresponding in shape to the outer periphery of the worm; the washer forms the abutment portion, and the front seal ring is sleeved onto the inner tube and abutted against the washer.

5. The waterproof spinning fishing reel as claimed in claim 4, wherein an outer periphery of the inner tube has an outer ring recess to accommodate the front seal ring.

6. The waterproof spinning fishing reel as claimed in claim 1, wherein the bushing has a tube portion sleeved onto the worm, and a stop edge extending radially from an inner end of the tube portion; the first inner race of the waterproof bearing is sleeved onto the tube portion and abutted against the stop edge in a way that the first inner race is restricted between the stop edge and the inner seal ring.

7. The waterproof spinning fishing reel as claimed in claim 6, wherein the accommodation of the housing is installed with a one-way bearing; the one-way bearing has a second outer race abutting against the housing, and a second inner race sleeved onto the worm and abutted against the bushing.

8. The waterproof spinning fishing reel as claimed in claim 7, further comprising a support ring piece sleeved onto the worm and sandwiched between the stop edge of the bushing and the second outer race of the one-way bearing.

9. The waterproof spinning fishing reel as claimed in claim 1, wherein the rotor assembly comprises a rotor having an inner tube; the abutment portion is formed at an inner end of the inner tube.

10. The waterproof spinning fishing reel as claimed in claim 9, wherein the inner end of the inner tube has an inner ring recess to accommodate a portion of the bushing and the inner seal ring.

11. The waterproof spinning fishing reel as claimed in claim 1, wherein the opening edge of the housing has a recess to accommodate the outer seal ring.

* * * * *